May 28, 1935.　　　P. WILLIAMSON, JR　　　2,002,809
LUBRICATING SYSTEM AND METHOD
Filed Aug. 19, 1929　　　4 Sheets-Sheet 1
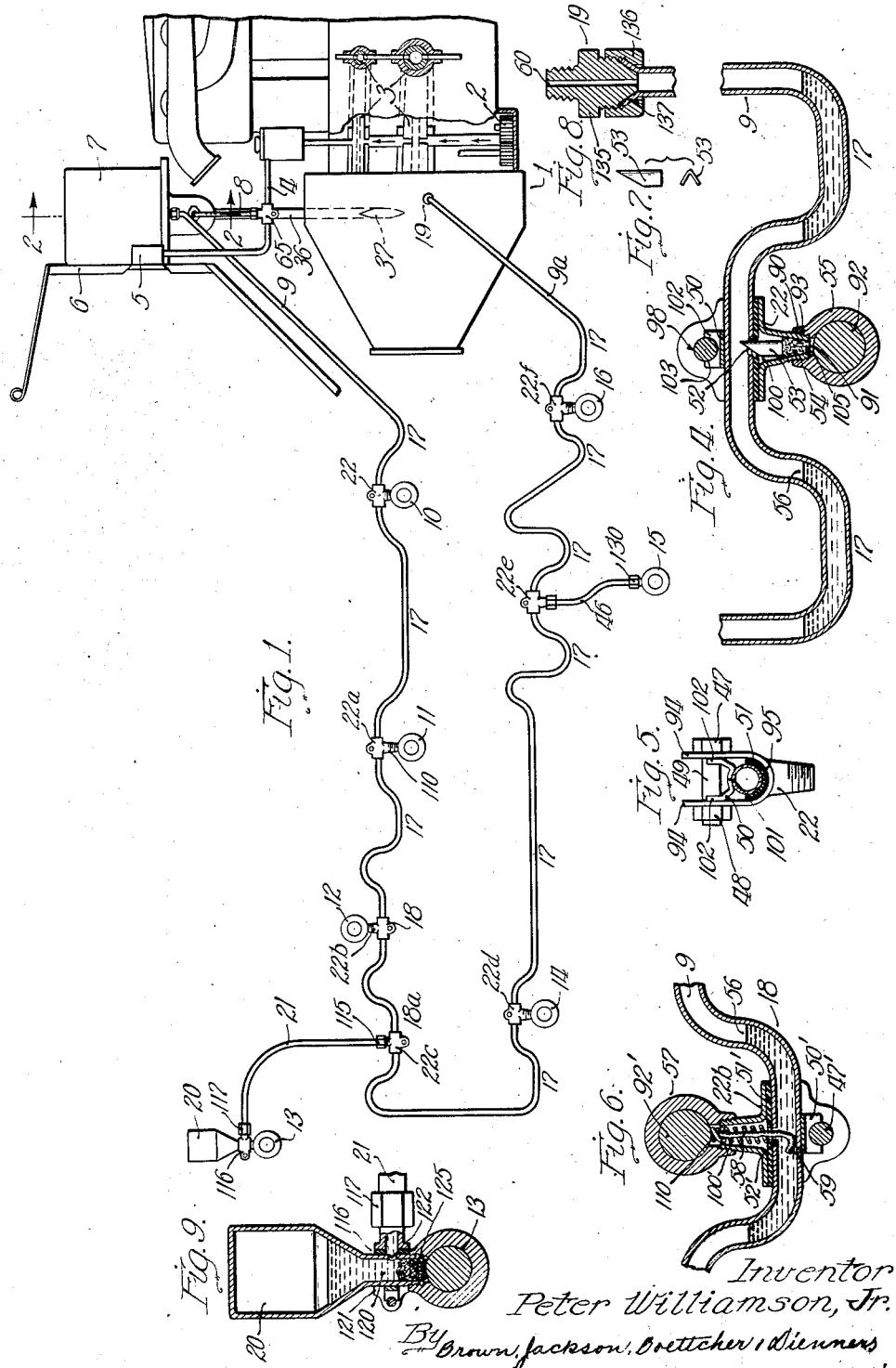
Inventor
Peter Williamson, Jr.
By Brown, Jackson, Boettcher & Dienner
Att'ys.

May 28, 1935. P. WILLIAMSON, JR 2,002,809
LUBRICATING SYSTEM AND METHOD
Filed Aug. 19, 1929 4 Sheets-Sheet 2
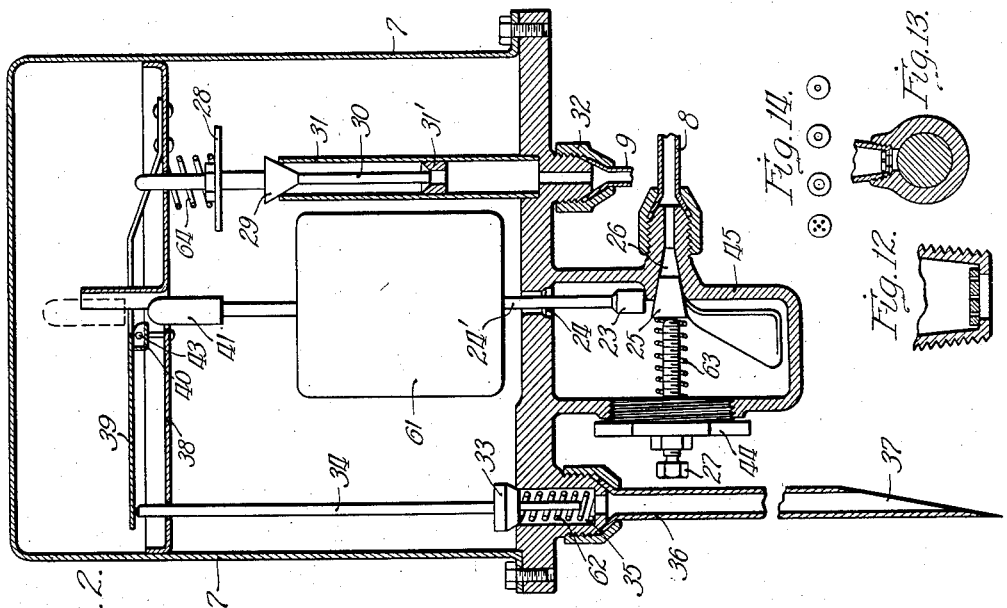
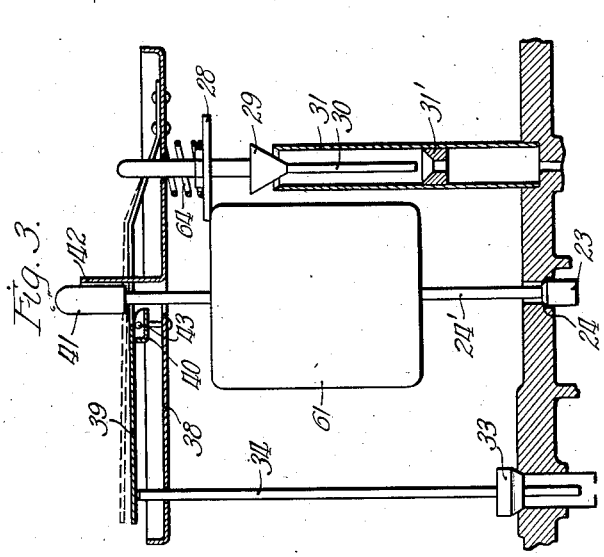
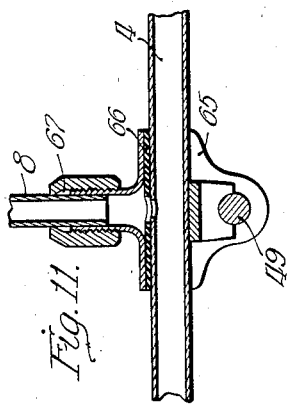
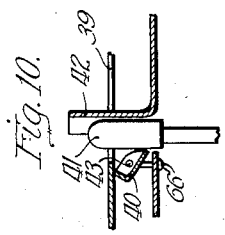
Inventor
Peter Williamson, Jr.

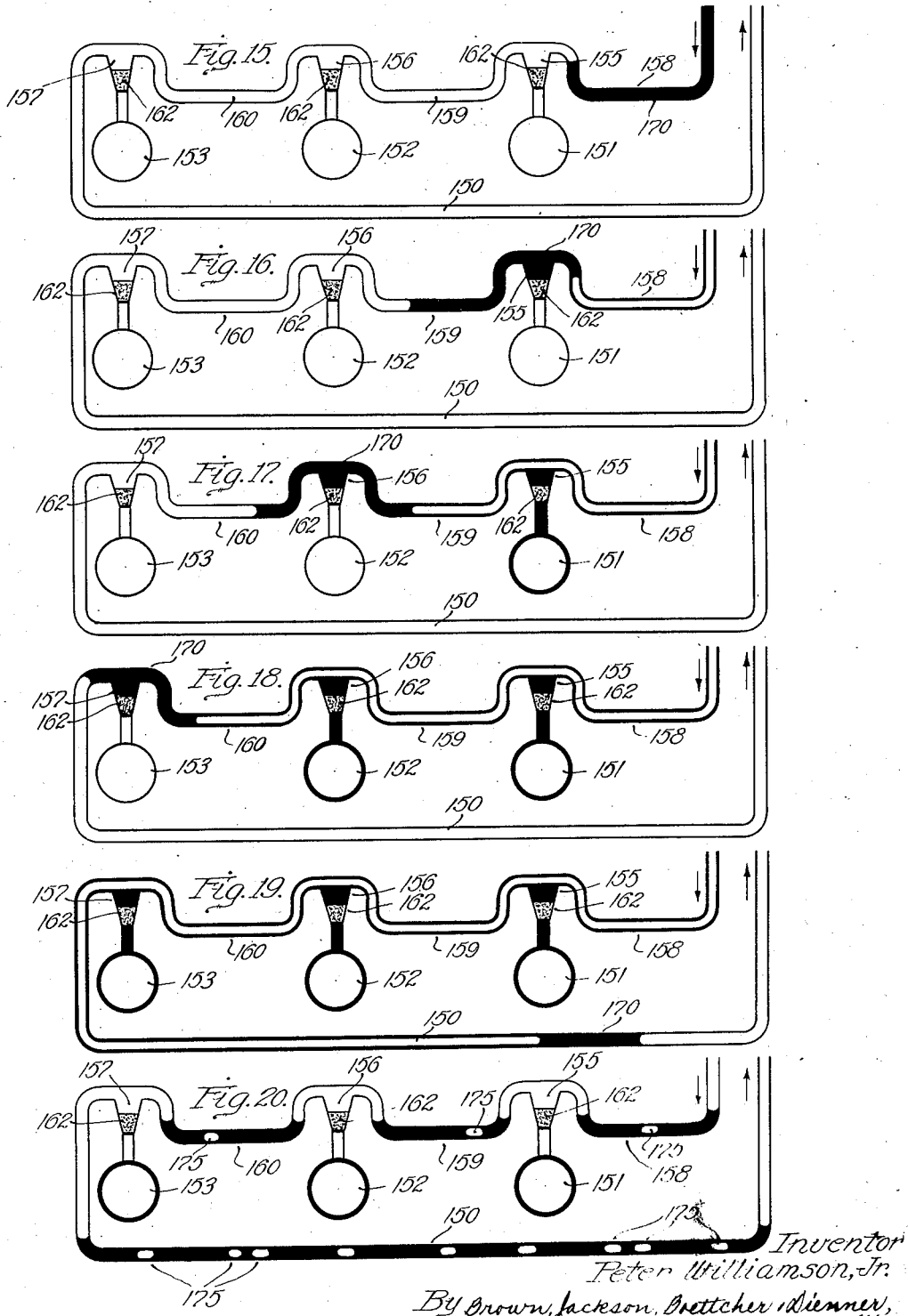

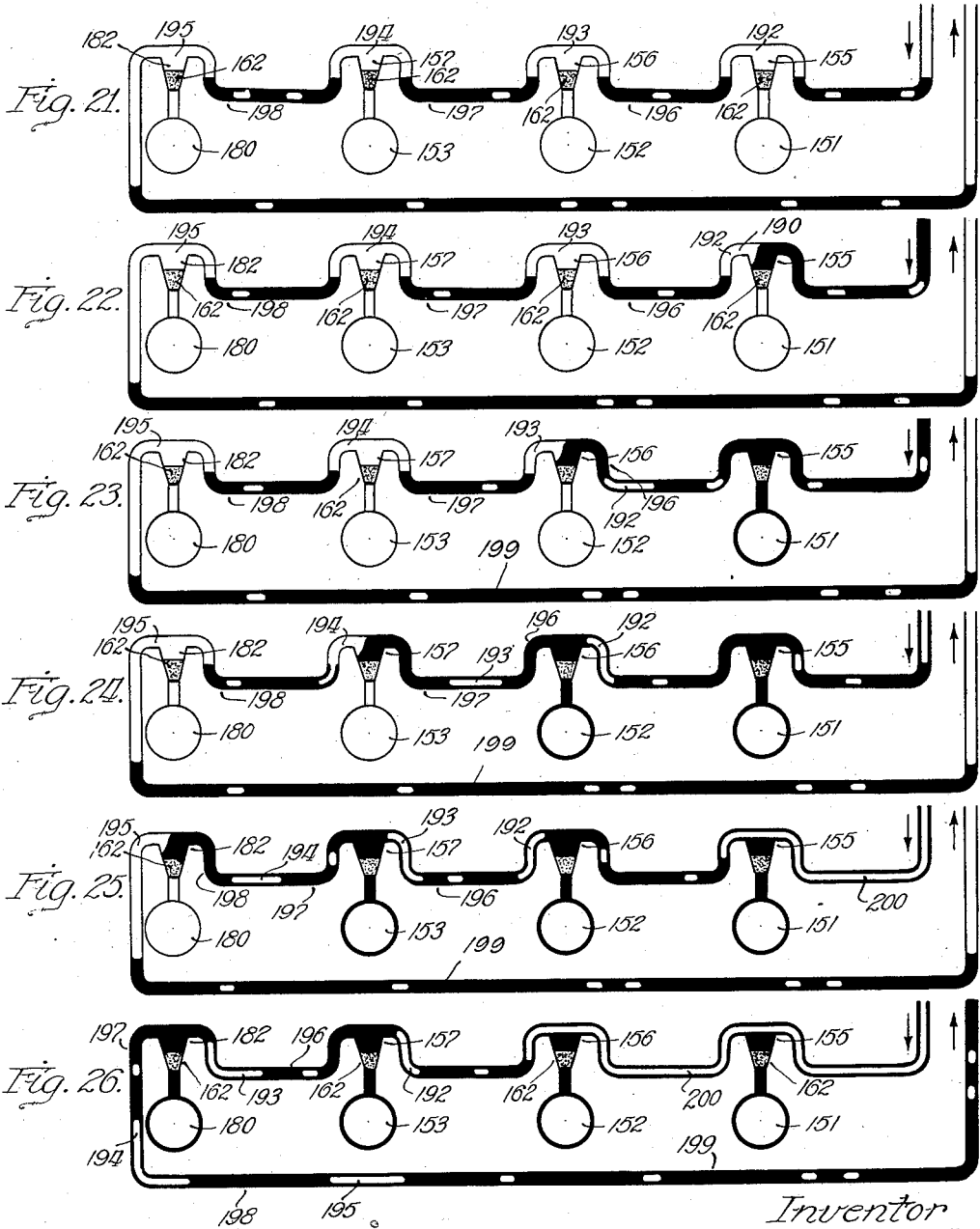

Patented May 28, 1935

2,002,809

UNITED STATES PATENT OFFICE 2,002,809

LUBRICATING SYSTEM AND METHOD

Peter Williamson, Jr., Everett, Mass., assignor, by mesne assignments, to Stewart-Warner Corporation, Chicago, Ill., a corporation of Virginia Application August 19, 1929, Serial No. 386,896

66 Claims. (Cl. 184—7)

This invention relates to lubricating systems and methods, more particularly to centralized lubrication and the present application is a continuation in part of my copending application, Serial No. 95,086, filed March 16, 1926.

The system and method of lubrication of my present invention is adaptable equally well to automotive work, more particularly to the lubrication of the chassis of vehicles, such as automobiles, tractors, gun carriages, war tanks, locomotives, aeroplanes, etc., or to industrial lubrication, that is to the lubrication of stationary machines, such as stamping presses, printing presses, textile machinery, shafting and all the numerous types of machines and machine tools of modern industry.

Prior methods of centralized lubrication employ an oil pump attached to an oil reservoir, a pipe line system leading from the pump to the bearings and metering units interposed between the pipe line and the various bearings.

Of these metering units, three types are employed, namely, pressure reservoir type, measuring valve type, and resistance unit type.

In all three types of units, the accurate metering of the oil depends upon the correct action of the metering units. In the pressure reservoir type and measuring valve type of unit, this action depends upon the by-passing qualities and the accuracy of the unit. This accuracy is of paramount importance in the resistance units where variations of .0001 of an inch to .001 of an inch results in a variation in quantity emitted of the order of about ten to one (10 to 1) among the units of the system where equal emission is expected. In certain types of resistance units, the difference between the outside diameter of the resistance unit plug and the inside diameter of the resistance unit body is only .0005 of an inch and accuracies of less than .0002 of an inch cannot be expected in quantity production.

Another important factor which enters into the matter of securing proper metering of oil with resistance units is the danger of deranging the entire process of lubrication when a lubricant of lower viscosity (thinner oil) is forced into the pipe line system after it was previously filled with a lubricant of higher viscosity (thicker oil). As soon as the thin oil has passed through a resistance unit nearest to the oil pump, all the thin oil with which the oil reservoir is now charged will escape through this one resistance unit or several of the proximate resistance units as the oil will choose the path of least resistance and, consequently, no lubricant whatsoever will pass throughout the entire system through the remaining resistance units.

This will be apparent when it is understood that the resistance of a resistance unit filled with heavy oil is often more than one hundred times as great as the resistance of a unit filled with thin oil, depending upon the viscosity of the oils. Once a pipe line is thus filled with oils of different viscosities and the break in lubrication has occurred, either the thin oil must be drained out of the reservoir and replaced with the previous grade of heavier oil or, in case it is necessary to continue to use a thinner grade of oil because heavier oil cannot be obtained, the entire pipe line system and all resistance units must be freed of the heavy oil and this means that these parts must be disassembled, cleaned and again assembled. This is a difficult and expensive operation and it leaves the pipe line full of air thereby introducing further serious consequences which will be explained later.

A similar inequality in the distribution of oil takes place where resistance units of equal resistance are situated under different temperature conditions. An example of this is in automobile chassis systems, particularly when running in the winter time where some of the bearings are situated under the hood near the hot engine and others outside as, for example, the king bolts, tie rod bolts, or shackle bolts that are exposed to outside temperatures. Likewise, in industrial lubrication, some bearings may be situated near the cold floor and others near the warm ceiling.

In certain kinds of machinery some bearings are exposed to ordinary room temperatures and others are exposed to heat.

Another difficulty involved in connection with resistance units is the clogging of the minute passageway of the resistance units (.0005" in plain plug resistance units and .015" in coil plug resistance units) by impurities in the oil. If felt is used in advance of the resistance unit, which lubricates by time, partial clogging of the felt will disturb the time metering of oil intended to be effected by the resistance unit.

The above explains some of the reasons why the present type of centralized lubricating systems employing resistance units and depending for their performance upon the use of a resistance medium as the sole metering means seemingly work well in the beginning but soon develop difficulties whereby certain bearings receive no lubricant while others are flooded or they receive an entirely different amount of lubricant—more or less—as anticipated.

Another hindrance to the proper operation of centralized lubricating systems using measuring valves or resistance units and which destroys the desired distribution of oil, is the presence of air in the pipe lines and metering units.

No centralized lubricating system of these types can be made to work properly unless and until all the air has been driven out of the entire pipe line system and out of all measuring valves or resistance units, and care has been taken to prevent the entry of any air into the system from an empty pump, or otherwise. Numerous attempts have been made to develop means for preventing air from entering the pipe line system from the pump.

However, the pump is not the only place from which air may enter the pipe line system. If, after all the air has been driven out during the priming of the system and air again enters from any cause whatsoever, the true metering of oil will be interrupted.

Air can enter the pipe line system in either of two ways:

1. Air may enter in restricted amounts due to a faulty pump valve or due to the small air bubbles entrained with the oil. Such entrained air becomes disentrained when the oil is allowed to stand and it accumulates in the form of air bubbles in the pipe line system. Also air may have accumulated at high spots or adhered to the inside of the pipe lines, so that it could not be dislodged during the priming operation.

2. Air may enter the system due to atmospheric pressure, forcing the same through an opening in the pipe line system as, for example, in a cracked pipe line, no matter how fine the crack may be, or through a cracked or faulty pipe coupling screw, a faulty seat in the pipe coupling body into which the pipe plug is screwed, or when a single one of the hundred or more pipe curs due to imperfect manufacture or assembling of any of the parts.

The present invention provides a novel lubricating system and method of lubrication particularly applicable to centralized systems and which is characterized by freedom from most of the limitations of known systems.

The main object of this invention is to provide a system and method of metering oil in centralized lubrication which is substantially unaffected by and independent of such minutiae as small quantities of air and particles of dust that may enter the system. It is unaffected by and independent of variations in accuracy in quantity production of metering units, of small cracks in pipe lines and pipe coupling screws. It is not dependent upon perfect mechanical construction and assembly and upon a perfect memory or rigid observance of rules by the operator, or the adherence to the use of oil of the same viscosity at all times and no other.

Another important object of my invention is to make a centralized system of lubrication which is foolproof. Instead of attempting to prevent air from entering the pipe line system I inject air into the system with the oil or behind the same, utilizing the air as a propelling medium for the oil.

Another important object of my invention is to provide a trap basin type of metering unit in place of the usual metering valve or resistance unit. The trap basin type of metering unit is filled during the time that oil and air are forced through the pipe line system.

Another important object of my invention is to prevent oil which may remain in the pipe line system, as by adhering to the walls of the pipe, from running out of the system, draining out, or siphoning out through the trap basin type of metering unit by disposing the pipe line unit during the filling operation. I cause the air in the trap basin unit to rise quickly and be conveyed away with the travelling charge of oil and air, preferably by interposing means in the path of the fluid travelling in the pipe line to catch oil from the pipe line and let it run down into the measuring chamber, therefore forcing the air upwards. This interposed means acts, in case of an atomized mixture of oil and air, to cause precipitation of the atomized oil and the deposit of the desired amount of oil into the measuring chamber.

Another object of my invention is to provide means to foster a turbulence of oil and air to produce a condition similar to a spray which will always convey the oil forward through a long pipe line of small inside diameter irrespective of the viscosity and the surface tension of the oil.

Another object of my invention is to employ the horizontal oil columns lying in advance of and below each of the metering units for filling such units during the time that the main oil column in the pipe line system is driven forward.

Another object of my invention is to provide a system which will be able to employ heavy or thin oils alternately without endangering the true metering qualities of my trap basin type of metering units.

Another object of my invention is to provide a system which is capable of using kerosene or gasoline, or the like, throughout the entire extent of the same for the purpose of washing out all of the bearings.

Another object of my invention is to make the metering action of the system independent of the temperatures around the various metering units.

Another object of my invention is to provide a system which will work equally well at all times, whether or not atmospheric pressure enters the pipe line system.

Another object of my invention is to provide progressive distribution of lubricant to all of the metering units, that is to say, oil is progressively distributed to the respective units one after the other in place of the usual system of simultaneously conveying oil through the pipe line system and driving the same into the bearings.

Another object of my invention is to provide progressive lubrication of the bearings, that is to say, the oil passes progressively to the respective bearings from the respective metering units, one after the other, in place of the usual system of simultaneously lubricating the bearings.

Another object of my invention is to provide progressive or consecutive lubrication of the bearings upon the first or priming lubricating operation on a new automobile, for example, and progressive or consecutive lubrication of the bearings after the pipe line system is once primed with lubricant and upon all subsequent lubricating operations.

Another object of my invention is to provide a combined system of progressive or consecutive distribution of lubricant to all of the metering units and progressive or consecutive lubrication of the bearings from the respective units.

Another object of my invention is to provide a lubricating system in the pipe line of which alternate slugs or columns of oil and air or other suitable gas are disposed in the operation of the system. The combination of broken up oil columns and air columns in the pipe line system makes the pipe line contents very resilient with advantages which have already been referred to and, in addition, this resiliency of the pipe line contents makes the distribution and lubrication of the bearings consecutive or progressive.

Another object of my invention is to provide resistance means between the metering unit and the bearing connected therewith for resisting the passage of oil from the metering unit to the bearing, that is to say, the oil is prevented from immediately running out of the metering unit to the bearing. The resistance of this means preferably exceeds the greatest bearing resistance in the system.

Another object of my invention is to simplify and reduce the cost of installing a centralized lubricating system.

Another object of my invention is to provide an improved metering unit element and an improved manner of applying the same to the pipe line. The metering unit structure and the coupling means, as well as the manner of coupling the same to the pipe line, obviates the necessity of cutting the pipe and also reduces the number of parts necessary for making the connection. The elimination of the necessity for sectionalizing or cutting the pipe line of the system enables the use of a continuous or one-piece pipe line, that may be attached quickly and with facility. The pipe line system of my present invention may be arranged conveniently as desired about the vehicle chassis and the necessity of pipe sections of fixed length and having definite relative positions is avoided. It is not necessary to dispose a number of such pipe sections in their proper relative positions and to couple these sections together.

Another object of my invention is to reduce the danger of leakage.

Another object of my invention is to utilize the bent portions of the pipe line adjoining the metering units as flexible means for accommodating a unitary or connected pipe line system to the bearings.

Another object of my invention is to reduce the cost of installation by providing a system in which the entire pipe line may be installed as a unit.

Another object of my invention is the provision of an improved connection between the metering unit and the pipe line.

Another object of my invention is to assemble or disassemble the unitary or connected pipe line system, without engaging or disengaging the pipe line portions between the metering units from the metering units or from each other.

Another object of my invention is to provide a system of centralized lubrication, which will supply predetermined quantities or doses of oil to each of the bearings, regardless of the distance of the bearings from the source, the relative height of the bearings, or the relative resistances offered by the bearings.

Another object of my invention is to provide a metering unit which shall combine the volumetric metering action with a resistance to flow from the metering unit to the bearing.

Another object of my invention is to provide a system in which the oil is distributed through a conduit, which is never entirely filled with oil.

Another object of my invention is to provide a system having means which will give a signal or indication to the operator when oil has been distributed to all of the bearings and particularly when the progressive distribution to all of the bearings has been completed.

Another object of my invention is to provide a system which will not be put out of order when the oil reservoir is empty or becomes empty.

Another object of my invention is to provide an oil measuring chamber, preferably adapted for measuring a predetermined amount of oil larger than the total amount that all of the metering units can hold with means for compressing a charge of air, which charge of air is adapted, in the oil distributing operation of the system, for driving the measured amount of oil into the pipe line system ahead of the air charge and the air charge passing into the pipe line system back of the body of oil. In the particular embodiment of the invention selected for illustration, the lubricant is forced into the measuring chamber and simultaneously stores energy by compressing the air above the lubricant entering the measuring chamber. The source of lubricant is illustrated as the crank case of the motor vehicle and the power for forcing the lubricant into the measuring chamber is derived from the normal operation of the vehicle by a typical oil pressure pump. This manner of forcing the lubricant into the measuring chamber, as well as the simultaneous storing of energy in this chamber and the manner of automatically controlling the inlet thereto, as well as the outlet therefrom, form per se no part of the present invention.

These features form the subject matter of my copending application, Serial No. 95,086, filed March 16, 1926, of which the present application is a continuation in part. These means are operative in the present system and are adapted for carrying out the present invention, but per se they may vary widely within the scope of the present invention. Their disclosure in connection with the present invention is illustrative and not limiting.

Another object of my invention is to prevent the oil from the oil measuring chamber from running into the pipe line system, except under the action of a charge of air.

Another object of my invention is to provide, in combination with my trap basin type of metering unit, resistance means for resisting the passage of oil from the metering unit to the bearing.

Another object of my invention is to employ an inverted siphon between a trap basin unit and the bearing where the pipe line cannot conveniently be carried to the location of the bearing.

Another object of my invention is to employ a wick between a trap basin unit and the bearing, where the pipe line cannot conveniently be carried to the location of the bearing.

Another object is to provide for connecting a trap basin unit to a bearing at a considerably lower level than the run of the pipe line.

Another object is to provide trap basin units of different volumes for metering by volume different amounts of lubricant for bearings requiring different amounts of lubricant. I accomplish this without changing the attachment fitting between the metering unit and the pipe line or the size of the connection between the metering unit and the bearing.

Other objects and advantages of my invention will be apparent from the following specification and claims.

In order to acquaint those skilled in the art with the manner of constructing and operating a lubricating system embodying the present invention, I shall describe, in connection with the accompanying drawings, a specific embodiment of the invention.

In the drawings:

Figure 1 is a more or less diagrammatic representation, in elevation, of parts of an automobile, showing a centralized lubricating system embodying the present invention, as applied thereto;

Figure 2 is a vertical sectional view through the oil measuring and air supply chamber, taken on the line 2—2 of Figure 1;

Figure 3 is a more or less diagrammatic showing of the float of the oil measuring and air supply chamber in raised position, with the valve controlling the outlet from this chamber to the pipe line system open and the valve controlling the communication from the entrance chamber to the oil measuring and air supply chamber closed;

Figure 4 is a longitudinal section, partially in elevation, through the pipe line and one of the improved oil cups or trap basin metering units shown as connected to a bearing;

Figure 5 is an end view of the oil cup or trap basin unit, showing the pipe line in cross section and illustrating the means for connecting the piping to the oil cup or metering unit;

Figure 6 is a section similar to Figure 4, showing one of my improved oil cups or trap basin units applied to a bearing from below;

Figure 7 is a showing of a side view and an end view of the element which is interposed in the path of the fluid travelling in the pipe line to catch oil from the pipe line and it it run down into the measuring chamber;

Figure 8 is a vertical sectional view of the outlet from the pipe line system back to the crank case or other oil reservoir;

Figure 9 is a cross section through a bearing and trap basin unit, showing a construction in which oil may be conveyed from the pipe line system to the trap basin unit for a bearing which is located above the run of the pipe line system;

Figure 10 is a diagram, showing the operating member for the spring which tends to hold the valve controlling the outlet from the oil measuring chamber to the crank case or oil reservoir closed;

Figure 11 is a sectional view showing one of my improved oil cups or trap basin units as used in place of an ordinary T coupling, to avoid cutting the pipe;

Figure 12 is a fragmentary section through the outlet end of the body of an oil cup or trap basin unit of my invention, showing another form of resistance element for resisting the passage of oil from the trap basin unit to the bearing;

Figure 13 is a cross section through a bearing, showing fragmentarily and in section the lower end of a trap basin unit applied thereto without threading;

Figure 14 is plan views of different forms of resistance elements for resisting the passage of oil from the trap basin unit to the bearing;

Figures 15, 16, 17, 18, 19 and 20 are diagrammatic side elevational views of the system of my invention, showing the operation of driving oil through the pipe line system and the consecutive or progressive filling of the trap basin measuring chambers of the metering units and the consecutive or progressive lubrication of the bearings, during the priming operation, that is to say, during the first lubricating operation on a new automobile; and Figures 21, 22, 23, 24, 25 and 26 are similar diagrammatic side elevational views, showing the same operation as stated in connection with Figures 16, 17, 18, 19 and 20, after the pipe line system is once primed with lubricant.

The respective parts indicated by the reference characters are as follows:

1 is the crank case of the engine; 2 is a conventional showing of the usual pump for the lubricating system of the engine; 3 indicates the pressure oiling system of the engine; 4 is an oil pipe leading to the pressure gauge; 5 is the pressure gauge for indicating the pressure of the oil in the system; 6 is the dash of the automobile on which the gauge is mounted; 7 is the improved oil measuring and air supply chamber; 8 is a pipe leading from the gauge conduit to the oil measuring and air supply chamber 7; 9 is a conduit leading from the chamber 7 past the various bearings; 10, 11, 12, 13, 14, 15 and 16 are bearings.

In operation, the pump 2 supplies oil under pressure to the oil measuring and air supply chamber 7, which measuring chamber measures out a predetermined amount of lubricant, which amount is greater than the combined capacities of the trap basin or oil cup measuring chambers of all of the metering units and serves at each operation to lubricate all the chassis bearings. As the oil enters the measuring chamber, it compresses a charge of air in this chamber above the body of oil and the oil from the measuring chamber flows under air pressure through the pipe line system, progressively filling one metering unit after another and progressively lubricating one bearing after another. The air is not cut off when the measuring chamber completes its delivery of the measured amount of lubricant to the pipe line system, but follows the oil into the pipe line system and propels the oil in a moving column, so as to drive all the surplus oil from the pipe line and return the surplus to the crank case or oil reservoir.

The bearings 10, 11, 12, 13, 14, 15 and 16 are not shown with regard to the respective positions on the chassis of the car, but simply for the purpose of indicating the application of the lubricating system of my present invention thereto. The outgoing pipe line 9 leads from the oil measuring and air supply chamber 7 to the trap basin measuring chamber of a metering unit 22 for the bearing 10. From the trap basin unit 22, the pipe line extends to a trap basin metering unit 22$^a$ for the bearing 11. The capacity of the trap basin measuring chamber of the metering unit 22$^a$ is illustrated as being larger than the measuring chamber of the unit 22 for the purpose of metering, by the metering unit 22$^a$, a larger amount of oil for the bearing 11 than the metering unit 22 meters for the bearing 10. From the metering unit 22$^a$, the pipe line continues to a metering unit 22$^b$ for the bearing 12. Bearings are frequently so situated that the oil must be introduced from the bottom and the trap basin unit cannot be disposed above the bearings and the inverted unit 22$^b$ is adapted for oiling such a bearing. From the metering unit 22$^b$, the pipe line extends to a fitting 22$^c$. From the fitting 22$^c$, a conduit 21 extends up to a modified trap basin unit 20 for the bearing 13, which bearing 13 is illustrative of a bearing located above the run of the pipe line system. From the fitting 22$^c$, the pipe line extends to a metering unit 22$^d$ for the bearing 14, which metering unit 22$^d$ is similar to the metering units 22 and 22$^a$ with its measuring chamber of a capacity intermediate the capacities of the measuring chambers of the units 22 and 22$^a$ for metering a volume of lubricant for the bearing 14, which is intermediate the volumes metered for the bearings 10 and 11. From the metering unit 22$^d$, the pipe line extends to a trap basin metering unit 22$^e$, which is connected by a conduit 46 to the bearing 15, this bearing 15 being illustrative of a bearing at a considerably lower level than the run of the pipe line and one manner of connecting one of the metering units to such a bearing. From the metering unit 22$^e$, the pipe line continues to a metering unit 22$^f$ for the bearing 16 and from the metering unit 22$^f$ the pipe line returns at 9$^a$ to the crank case or oil supply reservoir 1.

The above general description is intended to be explanatory and not limiting. For example, the particular relationship and combination of the different capacity metering units, as well as the particular relationship and combination of metering units connected to underlying and overlying bearings, as well as the relationship and combination of connections for bearings at a considerable distance above the run of pipe line or at a considerable distance below the run of pipe line may vary widely within the scope of my present invention. This relationship will depend upon the particular chassis or other mechanism to be lubricated. The connections, so far as the scope of the appended claims is concerned, may all be the same, or they may be combined differently, as desired. For the purpose of the present invention, I have shown all forms of connections in a single system and in an illustrative relationship.

The outlets from the metering units are sufficiently restricted that, during the pressure period, i. e., during the time that the air is driving the oil under pressure through the pipe line system and progressively filling the trap basins, that all of the trap basins will remain filled with oil at the end of the operation, delivering the oil to the trap basins. In the particular system illustrated, the lubrication is continuous in the sense that, while the restrictions in the outlets of the trap basins will keep the trap basins all filled at the end of the oil distributing operation, these restrictions may permit lubrication of the bearings from the trap basins during the oil distributing operation, as well as after completion of said operation. This may vary within the scope of the present invention and continuous lubrication, as referred to above, is not used in a contradictory sense with reference to the consecutive or progressive filling of the trap basin measuring chambers of the metering units and the consecutive or progressive lubrication of the bearings during the priming operation and after the pipe line system is once primed with lubricant.

In the illustrated embodiment, the restrictions or resistance means are in the form of fixed restrictions, which will perform the function of preventing excessive outflow from the metering units to the respective bearings during the pressure period or oil distributing operation. This may vary.

In Figure 1, 17 represents dips or downwardly bent portions of piping for purposes to be hereinafter described. 18 is a dip or downwardly bent portion in the pipe line system similar to the dips or downwardly bent portions 17, but located at the connection for the fitting 22$^b$ for purposes which will also be hereinafter described.

*Oil measuring and air supply means*

The oil measuring and air supply means may vary widely within the scope of the present invention. The particular means shown is the means of my parent application, Serial No. 95,086, filed March 16, 1926, of which the present application is a continuation in part. This means is suitable as the oil measuring and air supply means for the present invention and will be described sufficiently in connection with the present system to acquaint those skilled in the art with the manner of constructing and operating the present invention. It is to be understood that this means is illustrative means for supplying measured amounts of oil and a charge of air to the pipe line system and that the detailed description of this means is not limiting.

Referring to Figure 2, 23 is a valve controlling admission of the lubricant to the reservoir or chamber 7; 24 is the inlet to the reservoir; 25 is a restriction member for regulating the quantity of oil passing into the reservoir; 26 is a conical seat into which the restriction member is projected; 27 is an adjusting screw for the restriction member; and 28 is a disc mounted on the stem of the outlet valve of the reservoir 7.

30 is a pilot on the end of the valve 29. 31 is a stand pipe tube extending upwardly from the bottom of the reservoir and connected with the outlet 9 to the pipe line system. 31' is a collar fitted into the reservoir to receive the pilot 30. 32 is an S. A. E. pipe coupling nut for coupling the conduit 9 to the outlet at the bottom of the reservoir. 33 is another outlet valve controlling another outlet from the reservoir, which outlet is adapted for returning the oil not delivered into the pipe line system from the reservoir back into the crank case or source of oil 1. 34 is a valve stem fixed to the valve 33 and 35 is the outlet from the reservoir controlled by the valve 33. 37 is the bevelled lower end of the pipe 36. 38 is a perforated partition or spider mounted in the reservoir 7. 39 is a sheet metal spring resting on the valve stem 34 and tending to hold the valve 33 in closed position. 40 is a hinged operating member for the spring 39. 41 is a this weight with the sway of the machine, thus keeping the opening 26 clear.

The chamber 45 becomes filled with oil and the oil then passes up through the opening 24 into the reservoir or measuring chamber 7.

Assuming this reservoir to be empty at the beginning of the operation, both of the valves 29 and 33 will be closed, as shown in Figure 2, and the float will be in its downward position, as indicated. The outlets from the reservoir or oil measuring and air supply chamber 7 being closed, the oil fills up against the pressure of the air which is contained in the reservoir. This air is compressed in the top of the reservoir above the body of oil under an increasing pressure and this is the compressed charge of air which is built up in the chamber 7 and delivered into the pipe line system of the present invention.

This air, being compressed in the top of the reservoir, also tends to hold the outlet valves from the reservoir more firmly in their closed positions.

As the reservoir fills up, the float 61 begins to rise and, in its upward movement, the head 41 on the top of the float comes in contact with the member 40 and tilts it. A little later, the top of the float 61 comes in contact with the disc 28. This stops the rise of the float temporarily, as the disc 28 is held down by the spring 64 and also by the pressure of air within the reservoir 7 above the oil. The oil continues to rise until it has reached a point above the level of the top of the stand pipe 31 and, at some level below the top of the float in this position, the buoyancy of the float is sufficient to unseat the valve 29. When this occurs, a good deal of resistance to upward movement of the float is, obviously, removed, causing a further upward movement of the float. The valve 29 then slides into the of the oil and the head 41 comes into contact with the member 40, which it causes to tilt, as shown in Figure 10, and to raise the spring 39, allowing the spring 62 to raise the valve 33 and the oil also begins to run out through the outlet 35, but very slowly because the spring 39 has not been fully raised and the valve 33 is only slightly open.

As soon as the oil is down to the level of the top of the pipe 31, the air in the reservoir begins to pass out through this outlet and into the pipe line system 9, propelling the oil in a moving column, so as to drive all of the surplus oil from the pipe line system and return the surplus to the reservoir or crank case 1 and continues to do so until the pressure is relieved, thus blowing the surplus oil out of the distributing conduit system ahead of it and back into the reservoir or crank case 1.

After the pressure in the conduit has been relieved, the oil in the reservoir 7, below the level of the top of the pipe 31, runs out through the outlet 35, slowly at first, but with increasing rapidity, as the float falls and tilts the member 40, raising the spring 39 to its uppermost position and allowing the valve 33 to open fully. The valve 29 closes but there is no seal or air to prevent the oil from running out of the reservoir, for the reason that the outlet pipe 36 is of comparatively large diameter and has a bevelled end 37 to promote the bubbling up of air past the oil, the air filling the space in the reservoir 7 while the oil runs out. In this manner, the air is replenished in the chamber 7 for the succeeding charge of air which is compressed in this chamber and expelled into the pipe line system behind the measured charge of oil. When the oil has practically all run out, the float falls down to the bottom, releasing the member 40 and the operation is repeated automatically by the operation of the oil pump 2.

The restriction member 25 is adapted to resist the flow of oil to the reservoir or chamber 7 and is thereby adapted to retard the operation of the oil measuring and distributing means. This member 25 is held in the seat 26 by means of the screw member 27, which may have a lock nut for holding it in place, as shown. This resistance or restriction member 25 also serves the purpose of a check valve for preventing any return flow of lubricant, in case the pump is stopped while the reservoir 7 is partly filled with lubricant, the spring 63 forcing it back to its seat under such conditions. The spring 63 could even be omitted and the function would, ordinarily, be performed due to the pressure of oil forcing the valve back to its seat, but the spring increases the reliability of the operation.

The float 61 may be constructed of wood with a suitable oil proof body or it may be of hollow metal. The stem 24' being somewhat smaller than the valve 23 permits the oil to flow up into the reservoir 7 without operating the valve 23. The stem 24' serves the further purpose of holding the float in position. Further means for supporting the float might be provided in the form of a guide extending up from the bottom of the reservoir. Separate floats may, of course, be provided to operate the valves 29 and 33, but in this embodiment of the invention, these are operated by the single float.

The means for operating the valve 33 is the spring 62, which would normally lift the valve, but a stronger spring 39 is provided, which acts on the stem 33 to oppose the thrust of the spring 62. This spring is adapted to be slightly lifted by the member 40 when that member is tilted by the projection 41. While the projection 41 moves upward with the float, the member 40 is tilted out of contact with the spring 39, leaving the valve 33 closed, and allowing the reservoir to fill, but when the float reaches its upward position, the member 41 passes above the member 40 and out of contact therewith, with the result that the member 40 tilts back into the position shown in Figure 2 by its own weight, it being noted that the member 40 is suspended above its center of gravity by a pivot or hinge 43. As the float returns downward, the member 41 comes into contact with the member 40, but since the bottom of the member 41 projects at a rather sharp angle from its stem, there is no tendency to tilt the member 40 upwardly at that end and the tendency is to tilt it downwardly to raise the spring 39. At first, the spring 39 resists the movement with sufficient force to stop further downward movement of the float, which is, at first, almost entirely supported by oil and by the pressure of the oil in the chamber 45 against the valve 23, but as the oil flows out of the reservoir 7, more of the weight of the float acts on the member 40 until at a point when the oil level is just slightly above the top of the pipe 31, the spring 39 is sufficiently overcome to allow the spring 62 to lift the valve 33.

This valve is lifted very little, if at all, at this point, for the reason that there is considerable air pressure in the reservoir above the oil and this pressure tends to seat the valve 33, it being noted that the reservoir was full, or sufficiently full, of air at atmospheric pressure when the operation was started, and that this air has been compressed into a volume which is less by the volume of the reservoir between the bottom of the air charge in the chamber 7 at the beginning of the oil measuring delivery into said chamber and the upper level of the oil which is reached in said measuring chamber at the end of the oil measuring delivery into said chamber.

At the point in the discharge of oil from the reservoir 7, at which the level of oil was just above the top of the stand pipe 31, the air begins to flow out of this pipe along with the oil. When the oil reaches the level at which no more oil can flow out through the end of the stand pipe 31, the compressed air continues to relieve itself through the pipe 31 and into the pipe line system, blowing the surplus oil ahead of it through the restricted outlet 19 (Figure 8) back into the crank case or reservoir 1.

When the last of the stream of oil passes through the restricted outlet port 60 of the restricted outlet 19, the air pressure relieves itself with great rapidity and begins to approach atmospheric pressure in the top of the reservoir 7.

The pressure resistance to the opening of the valve 33 now being greatly reduced, this valve can open and the downwardly moving flow operates the member 41 to hold the member 40 in tilted position with the end of it sliding along the side of the member 41 as this member moves down with the flow. The valve 23 passes below the mouth of the inlet and allows lubricant from the pipe 8 to begin to flow into the reservoir, but the amount of this is too small in proportion to the amount flowing out through the outlet pipe 36 as to be of any consequence and the oil level continues to fall until the float reaches a level at which the member 41 no longer contacts with the member 40 and the spring 39, being released, closes the valve 33. It will be noted that, during the time that the valve 33 was opened, the pressure in the reservoir was kept at substantially atmospheric value, due to the fact that the valve 33 and the outlet pipe 36 are of sufficiently large size to allow oil and air to pass, so that the air releases the oil in the reservoir. There might also be a slight backward flow of air through the conduit.

After the engine has been running for some time, the oil becomes quite hot and, under these conditions, the reservoir 7 might fill with undesirable rapidity. To prevent this condition, I adjust the respective sizes of the parts with relation to the pressure developed in the oiling system of the car to which it is to be applied in such proportion that the amount of pressure ordinarily delivered by the pump when the oil is hot is not sufficient to fill the reservoir to the level necessary to start the lubricant distributing operation and, under these conditions, when the engine has been running for some time, the oil level in the reservoir may be almost, but not quite, up to the point at which the valve 29 is lifted.

When the engine stops, the spring 63 operating the resistance member 25 as a check valve will preclude any return flow of lubricant, leaving the level of the oil in the reservoir at this point. After the car cools off and is started again, the oil being cool and viscous is delivered under considerably higher pressure by the pump and thus quickly raises the level of the oil in the reservoir to the level necessary for operation or raising of the valve 29.

It will be noted that, once the valve 29 is raised or operated, the completion of the operation of the oil distributing and lubricating operation does not depend on the continuance of the engine operation. That is to say, the desired quantity of oil having been measured and the desired air charge compressed, the oil distributing and lubricating operations are completed by the flow of the oil charge into and through the pipe line system under the pressure of the air charge. If the valve 29 is closed and the engine stops, it, of course, cannot open during the period of rest, but if it opens before the stopping of the engine, even if only an instant before stopping the whole oil distributing and lubricating cycle of operations will be completed, regardless of the stopping. This is a desirable feature of my present invention.

*Oil cup or trap basin type of metering units*

The metering unit of my invention has a number of advantages, namely;

1. Perfect metering without depending upon extreme accuracy of construction and independently of air in the pipe line system or of grit in the lubricant or different grades of lubricants and the like.

2. Reduction in cost over the usual combination of pipe line T's and metering units.

3. Uniformity in the structure of the trap basin unit for different applications or different connections with the bearings.

4. Elimination of cutting or making the pipe line system in sections and elimination of threaded connections or other coupling means between such sections, as well as elimination of assembling and connecting separate pipe sections into the desired pipe line system.

5. Formation of the entire pipe line system from a single length of tubing and the provision of metering units adapted to be applied thereto without cutting or sectionalizing this tubing. Aside from the other advantages, the difficulties encountered in a sectionalized system where one pipe line section is adapted to fit between two particular bearings and not between certain other bearings are, obviously, avoided.

Figure 4 shows a typical form of trap basin metering unit of my invention, together with the adjacent portions of the pipe line system. This might be the metering unit for the bearing 10 but, in this case, the bearing is designated at 55. The bearing 55 has a boss 90, having a passageway 91 extending through the boss 90 and opening at its inner end to the outer surface of the spindle 92 or other part in the bearing 55. The opening 91 is internally threaded at 93, the threaded portion shown being tapered, although this may vary. The body of the unit 22 is in the illustrated embodiment of the invention made of sheet metal and pressed to the form shown. The body 22 is of generally U-shape cross section, with the sides 94 adapted to receive and embrace the adjacent portion of the pipe line 9. The U-shaped body is applied by slipping the open end over the pipe line at the desired location and the base of the U-shaped body is rounded at 95, to conform with the periphery of the pipe. The lengths of the sides of the U-shaped body 22 exceed the diameter of the pipe sufficiently to form extensions, which are provided with openings 98 (Figure 4) for receiving the bolt 47 for clamping the oil cup or trap basin unit to the pipe. The gasket 51 is interposed between the rounded base 95 of the body of the metering unit and the adjacent surface of the pipe and the clamping member 50 is disposed between the legs of the body 22 and is held between the shank of the bolt 47 and the opposite side of the pipe, pressing the pipe firmly against the gasket 51, which seals the joint between the body 22 and the surface of the pipe, particularly around the hole 52 and around the top of the trap basin measuring chamber 100 of the metering unit.

The clamping member 50 is of generally U-shaped form, with the base portion 101 conforming with the periphery of the pipe and with the legs 102 clamped between the legs of the body 22 and notched at 103, with the shank of the bolt 47 engaging in these notches to hold the clamping member against displacement longitudinally of the pipe.

The lower end of the body 22 has an outlet 105 communicating with the passageway 91 and this outlet 105 is restricted as, for example, by the resistance felt plug 54. The resistance felt plug 54 restricts the outlet 105, so that, during the pressure period, that is, during the time that the air is driving the oil under pressure through the pipe line system and successively filling the trap basins, all of the trap basins will remain filled with oil at the end of the oil distributing operation. In other words, upon the introduction of oil into the trap basin unit, this oil must first penetrate the resistance member 54 before it passes to the bearing so that, even with a relatively slight resistance at the bearing, the resistant plug will prevent the oil from running out of the metering unit immediately and will cause the trap basin to remain filled with oil at the end of the distributing operation. The resistance member retains the metered charge of oil in the trap basin for a continuous lubrication thereafter, that is, for a continuous lubrication while there is oil in the metering unit.

From the resistance plug 54, a pin-like member 53 extends upwardly from the measuring chamber of the resistance unit through the pipe opening 52 and into the pipe line 9. This pin-like member 53 may be formed of sheet material and is, preferably, of V-shaped cross section, as shown in Figure 7. Its upper end is pointed, as by bevelling off the upper end. Its lower end may be supported upon the resistance plug 54, or otherwise, and the open formation of this pin-like member 53 allows free passage of oil into and from the metering unit around and between the V-shaped sides of the pin.

The pin performs a number of functions. It captures the oil, which is driven through the pipe line system into the measuring chamber 100 of the metering unit, as will be described later. It assists in conducting the oil to the bottom of the chamber 100, so that the air will be more readily freed from the trap basin. The pin-like member 53 tends to catch and precipitate oil, which may be in an atomized state in the air flowing through the pipe line system. It tends to conduct the oil down into the bottom of the trap basin, filling the same from below and tending to free the air, which otherwise might be trapped in the oil within the trap basin.

The metering unit 22ᵃ for the bearing 11 is similar to the metering unit 22, except that the measuring chamber thereof is larger for the purpose of metering a larger amount of lubricant for the bearing 11. This is done by merely lengthening the body 110 of the unit 22ᵃ, the other parts remaining the same, it being understood that the pin-like member 53 of this unit 22ᵃ may be lengthened to provide an action corresponding to the action described in connection with the unit 22. It can be seen, therefore, that the capacity of the trap basin metering unit 22ᵃ, that is, the volume of the internal measuring chamber thereof below the pipe line 9 at the opening corresponding with the opening 52 of Figure 4 may be varied to control the capacity of the unit, so that it may receive and introduce into the bearing a greater or less quantity of lubricant, in accordance with predetermined design.

It will be observed that the incoming side of the pipe or tube 9 extends from the lower level 17 and is bent upwardly to the connection of the metering unit therewith and, likewise, the delivery side of the pipe line extending on from the metering unit is bent down to a lower level 17 and that oil is shown as trapped within the lower parts or dips 17 of the pipe line. This is the oil which is drained from the walls of the pipe after a lubricant distributing operation.

Where the bearing, such as 12, shown in Figure 1, is so situated that the oil must be introduced from the bottom and the trap basin unit cannot be disposed above the bearing, I provide the form of unit shown in Figure 6. In this case, the bearing is designated at 57, but this manner of lubrication is illustrative of the lubrication for a bearing such as the bearing 12 of Figure 1. The body of the metering unit 22ᵇ is fastened to the pipe line in the same manner in which the body 22 of Figure 4 was secured and connected to the pipe. That is to say, the U-shaped body is clamped upon the pipe by the bolt 47' and clamping member 50' and there is a gasket 51' between the rounded base of the U-shaped body and the adjacent side of the pipe. The metering unit body is, however, inverted and the opening 52', through which access is had thru the chamber 100' to the bearing surface of the pin 92'; for example, in the bearing 57 is formed through the top of the pipe and opens upwardly through the chamber 100' to the bearing.

In this case, it will be observed that the incoming side of the pipe 9 is bent downwardly to the connection with the metering unit and, likewise, the delivery side extending from this metering unit is bent down from a higher level to a lower level at the connection with the metering unit and oil is shown as trapped within the lower part of the pipe at 56. It is plain that this trapped oil 56 will run into the space within the body of the metering unit 22ᵇ and for the purpose of conveying this oil to the bearing 57, I provide a wick or capillary cord 59.

This wick 59 is knotted at its upper end at 110 and this knotted upper end 110 is held against the bearing, as shown by a coil spring 58. The wick 59 may be of packing material and its lower end extends down into the oil 56, the wick being placed within the coil spring 58, which is interposed between the outer surface of the pipe 9 around the opening 52 and the upper knotted end 110 of the wick. Obviously, the puddle of oil collects in the dip 18 and the oil is carried from this puddle by capillary action thru the wick 59 to the bearing against which the upper end of the wick is pressed by the spring 58 and, as long as there is any oil in the depression 18, the bearing 57 will be lubricated.

I do not intend to be limited to making the capacities of the metering units different solely by lengthening the bodies of these units, but they may be made of different capacities by otherwise increasing the volumes of the internal chambers thereof.

In Figure 9, I have shown a construction in which oil may be conveyed from the pipe line system to the trap basin unit for a bearing, which is located above the run of the pipe line system. In some cases, there are bearings which are so positioned, with respect to the run of the pipe line, that it is not desirable to carry the pipe line over the bearing, as in the construction shown in Figure 4. In that case, I may employ the construction shown in Figure 9, which illustrates in detail the lubrication for the bearing 13 of Figure 1.

In Figure 1, the pipe line 9 is bent or turned down from a higher level to a T-fitting 22ᶜ on the inlet side from the pipe line to the fitting 22ᶜ, that is, on the side leading from the oil measuring chamber and on the opposite side, that is, on the side leading forward to the discharge end of the pipe line system, the pipe line is likewise bent or turned down from a higher level to the fitting 22ᶜ. The fitting 22ᶜ is identical in form with one of the metering unit bodies and is applied in inverted position, as in Figure 6 and, in this case, forms a T-coupling. This type of fitting, therefore, has a wider use than merely as a metering unit body and this use illustrates its adaptability as a T-coupling for application in any piping system and it obviates the necessity of cutting the pipe and reduces the number of parts and connections necessary. The third leg of the T, thus formed, is disposed upwardly in vertical position, the lateral communication with this leg, that is, with the interior of the body of the fitting being had through an opening in the pipe line similar to the opening 52 of Figure 4. The downwardly bent or dipped portion of the pipe line at the fitting 22ᶜ forms a liquid trap.

A single branch conduit or pipe 21 connected with the upright leg of the fitting 22c at its lower end, as by means of a coupling nut 115, extends upwardly to a trap basin unit 116 which, in this case, has only the inlet connection with which the upper end of the conduit 21 is connected, as by means of a coupling nut 117.

The upper end of the fitting 116 comprises a cup or air chamber 20, having a depending tube 120 opening downwardly to the bearing 13. The fitting 121 is again similar to the fitting 22 of Figure 4, but, in this case, it is clamped to the tubular portion 120 of the metering unit 116 with its body portion connected with the upper end of the pipe 21 by the coupling 117 and with the upper end of the pipe 21 in communication with the internal measuring chamber of the metering unit 116, through this body and the port or opening 122 in the tube 120. The outlet from the lower end of the tube 120 to the bearing 13 is again restricted by a felt resistance plug or felt resistance means 125.

Oil tends to be trapped in the downwardly bent portion of the pipe line system at and in the fitting 22c and, when the pressure is admitted to the pipe line system, oil will be driven up through the pipe 21 into the body of the metering unit 116 and in the air chamber 20, filling the metering unit and depositing a metered amount of oil in the measuring chamber. When the pressure is released here, the air in the chamber 20 expands and any surplus of oil which might be contained within said air chamber 20 or in the metering or trap basin unit is expelled through the pipe 21, limiting the oil to a metered amount, as in the other embodiments.

The metering or trap basin unit may be connected to a bearing at a considerably lower level than the run of the pipe line 9 by a construction such as that shown for the bearing 15 in Figure 1. In this case, the metering unit 22e, instead of being connected directly to the bearing, is provided with a conduit 46, leading from the metering unit 22e to the bearing 15. At its lower end, the tube or conduit 46 may be connected with the bearing 15, by means of a suitable coupling 130.

Heretofore, every metering unit, every pipe connection, and every one of the very many short pieces of connecting pipe have been shipped separately to the automobile or industrial machinery manufacturers and many loose pieces had to be assembled on the automobile or industrial machine by first screwing the metering units into the female pipe threads of the bearings and then attaching the many short pieces of pipe to the metering units and to the pipe connections by means of pipe coupling screws. Since there are three pipe coupling screws to each T and one T to substantially each metering unit or bearing and thirty to fifty bearings on an automobile chassis, one hundred to two hundred pipe coupling screws were heretofore required to be screwed down on each pipe line system. This is a very tedious and very expensive operation, with the additional disadvantage that oil will leak through imperfectly attached pipe coupling screws. This means also that air will enter the pipe line system. In order to reduce the large cost of assembling to a minimum and to prevent leakage at the same time, I provide for making the entire pipe line system of a single length of pipe and installation is thereby reduced to the simple matter of connecting the metering units to the bearings and to the pipe line.

The number of parts, which it is necessary to ship and assemble in my improved system may be limited to the number of metering units, and the single length of pipe and the problem of short or separate pieces of pipe and the manner of arranging and connecting these together may be entirely obviated.

In addition, the trap basin metering unit bodies are particularly adapted to be easily and conveniently applied, not only to the bearings, but to the pipe line system as well.

The main purpose of the trap basin unit is to meter, by volume, the exact amount of lubricant needed for lubricating the corresponding bearing, instead of depending upon the resistance of a fine passage, which requires great exactness as to all of the characteristics involved. If, for instance, my trap basin type of metering unit has a capacity of ten drops of oil and this trap basin is filled with lubricating oil during the pressure or distributing period, and all the additional oil which is situated above the rim or top of the trap basin of the metering unit is wiped or driven away by the air following the oil in the pipe line and the outlet is sufficiently restricted, then only these ten drops and no more and no less will run into the bearing by gravity after the pressure has terminated.

In this manner, it is possible to depend absolutely upon the true metering qualities or true oil distributing qualities of my system.

The pin-like member 53, in addition to the action already set out, conducts the oil by capillary attraction to the bottom of the trap basin and the conduction of the oil to the bottom of the trap basin forces the air upward as already explained.

By the employment of the resistance plugs 54, or as indicated at 125 in Figure 9, it will be seen that the outlet from the trap basin unit to the bearing is never shut off. It would appear, therefore, that the continued application of pressure while the remainder of the charge of oil is passing through the pipe line system and the excess returned to the oil supply reservoir 1, the oil might be forced out of the trap basins and out of the bearings so that a charge would not be retained in the trap basin for continuous lubrication thereafter. This is not the case. The resistance units 54, 125, afford a resistance to flow and during the relatively short time that pressure is applied to the system, only a very small quantity of oil will be forced into the bearing, but this small quantity will not prevent the trap basin from remaining filled to the very end of the filling or distributing operation, that is, the period of pressure, for the simple reason that the continued passage of air following the charge of oil tends to atomize and flow along through the pipe line system oil which has tended to adhere to the walls of the pipe by the resistance in the pipe line and such as is accumulated at the bends in the pipe line system and there atomized. Therefore, this continued flow of the air carrying oil partly in suspension and partly wiped along the walls of the pipe line system will keep the trap basins all filled during the pressure period.

As a result, the dropping of the pressure to atmospheric, as by blowing out the discharge end into the crank case or reservoir 1, will find all of the trap basin units filled with lubricant.

The oil will then slowly pass through the resistance elements and be discharged into the bearings by gravity. The moving current of expanding air drives along liquid on the inner walls and entrained in the current of air. Such liquid impinges against the pin-like members 53, which tend to conduct the same down into the bottom of the trap basins, filling the same from below, and freeing the air that might be trapped therein, as already explained.

In all forms of the metering units, access may be readily had to the interior of the unit, without the necessity for unscrewing the same from the bearing. Any unit may be conveniently disconnected from the pipe line, so that access may be had to the inside thereof for inspection or repair, without disturbing the pipe line, that is, without separating sections thereof.

The bends in the pipe line system serve as means for causing the entrainment of oil in the current of air, and hence, even if the bore of the pipe be relatively large, the current of air will tend to convey the oil along partly by driving the charge of oil ahead of it and partly by carrying the same along in the current of air.

After the charge of oil and the following air have been expelled at the discharge end of the pipe line system into the crank case or reservoir 1, the oil which adheres to the walls of the pipe line system tends to drain in the traps between the trap basin units. Air will remain in the arched portions over the bearings, or over the trap basin units, so that no additional oil will drain into the trap basin units and tend to flood the bearings and also these bends serve to provide the additional function of giving a certain flexibility to the pipe line system.

In order to prevent the oil remaining in the pipe line from draining out through the metering units, I bend the pipe line near the metering unit in each case, to create two levels. One pipe line level is situated above the measuring chamber or trap basin of my metering unit. The other level is below the same. Therefore, when oil is forced into the pipe line system and air pressure follows the oil, and after most of the excess oil and all of the excess air have been blown out of the pipe line system and returned to the oil reservoir, the oil which has adhered to the interior of the pipe line system by adhesion and surface tension will run down to those portions of the pipe line system situated below the trap basin of the metering unit, while the air remaining in the pipe line system will rise to the upper level, which is not only over the trap basin of the metering unit, but also around the attachment of the metering unit to the pipe line.

For this reason, air and not oil will always be over the trap basin metering unit, thereby rendering it impossible for the oil in the pipe line system to drain out or siphon out through the metering unit or through the bearing. The arched or inverted generally U-shaped portion of the pipe line around each metering unit serves another purpose. It makes the pipe line system flexible at all places, particularly between each two adjacent bearings, whether these bearings are situated on a common rigid member or are connected to a relatively moving member.

The outlet end of the pipe line system leading back into the crank case or reservoir 1 is preferably provided with a plug 135 having a restricted discharge orifice 60. This plug may be threaded at one end for attachment to the crank case or reservoir 1 and at the opposite end to receive a coupling member 136. The outlet end of the outlet or discharge portion 9ª of the tube 9 is belled out at 137 and clamped between correspondingly tapered seating portions on the plug 135 and in the coupling member 136. When the last of the stream of oil passes through the restricted outlet duct 60 in the oil distributing operation, the air pressure is adapted to relieve itself with great rapidity and begins to approach atmospheric pressure in the top of the reservoir 1. The oil or air column, or both, after they leave the metering unit for the last bearing in the pipe line system and discharge back into the oil reservoir or crank case 1 through the restricted duct 60 creates a peculiar hissing sound.

This sound forms an indication for apprising the operator that the last bearing that is the metering unit for the last bearing and the metering unit for each bearing preceding it has received a supply of oil in the distributing operation. In other words, this sound forms an indication for indicating to the operator that the last bearing, and each one preceding it, is lubricated or provided with oil for lubrication. In my invention, it does not make any difference what means are employed to notify or indicate to the operator that the last bearing has received a charge of oil—and when the last bearing has received its charge of lubricant, all bearings have received their charges of lubricant—so long as an indication is given or his attention is attracted by a signal.

*Operation*

Assume that the oil pump has charged the measuring and air supply chamber 7 with the predetermined quantity of oil and that the charge of air has been compressed in the chamber 7 above this oil and that the valve 29 leading to the pipe line system has opened.

The distribution of lubricant to the various metering units is progressive in character, that is to say, the various trap basins receive their charges of lubricant, one after the other, and not simultaneously. One of the advantages of this progressive distribution of the lubricant is the enabling thereby of the signal or indication when the last bearing has received its charge of lubricant, as above referred to.

The charge of oil is driven thru the oil and air delivery end into the pipe line system 9 with the charge of compressed air following the same. As the charge of oil moves forward and the air follows, some of the oil will adhere to the inner surface of the pipe line, as plainly indicated by the heavier lines behind the charge of oil in Figures 16, 17, 18, and 19. As the charge proceeds, as shown in Figure 15—Figures 15, 16, 17, 18 and 19, showing the consecutive or progressive filling of the trap basin measuring chambers of the metering units and the consecutive or progressive lubrication of the bearing during the priming operation, it being understood that subsequent operations, as shown in Figures 21, 22, 23, 24, 25 and 26, are substantially the same, except that the pipe line system is primed with lubricant—oil will enter the first trap basin unit of the first of the three bearings shown in Figures 15 to 20. The resistance felt plug for this unit restricts the outlet from the metering unit and thereby the lubrication of the bearing therefrom. The body of oil in excess of the requirements of the first trap basin unit is driven on through the pipe line system towards the next unit leaving the first trap basin full of oil to the level of the pipe and filling the second unit. The body of oil then follows on to the third unit, leaving the proper metered charge of oil in the second trap basin unit. The third trap basin unit is then filled, as are all succeeding units and the excess of oil is then driven on in the pipe line system into the return end 9ª, from which it is discharged through the restricted orifice 60 back into the crank case or reservoir 1.

As soon as the remainder of the charge of oil has been discharged into the crank case 1, the compressed air back of the same escapes through the restricted orifice, giving the signal or indication heretofore referred to. At the same time, the pressure in the pipe line system drops to atmospheric or substantially atmospheric pressure, the float 61 drops to the bottom, the valves 29 and 33 close in the manner already explained, and the operation is repeated by delivery of oil from the pump 2 into the measuring and air supply chamber 7.

As the resistance plugs 54 for the respective metering units are penetrated by the oil, the oil will pass from the resistance units to the bearings. This passage may occur partially during the pressure period, without impairing the filled condition of the metering units at the end of the oil distributing operation, as already explained, but the resistance of such plugs will usually prevent appreciable, if not all, passage of oil therethrough and to the respective bearings until the completion of the pressure period, whereupon the oil will have sufficient time during the relative long lubrication period which follows the pressure period to run or seep through the felt plugs by gravity and thereafter lubricate the bearings. During the interval between lubricant distributing operations, as determined by the operation of the oil measuring and air supply means, the draining of the trap basin full of oil into the bearing will keep the corresponding bearing suitably lubricated, and the bearing will be provided with the exact metered amount of oil required therefor, which may be different for different bearings, as already explained.

After the distribution operation has occurred, the oil adhering to the inside walls of the pipe line system will tend to gravitate to the lower points of the system, as shown in Figures 20 and 21, and it will be observed that the depressed portions of the pipe line system on each side of the metering unit serve to receive and retain such oil as collects from the walls of the pipe line system. Since these parts are bends or portions of the pipe, itself, and not fittings, there will be no tendency to leak oil at the fittings, nor will there be a tendency to drain the accumulated oil out of the bearings or accidental leak at a fitting.

The charge of oil flowing in the pipe line system ahead of the charge of compressed air affords a high degree of retardation to rapid flow and travels more slowly than would the charge of compressed air, if unobstructed by the charge of oil. Hence, the air which is expelled from the pipe line system ahead of the charge of oil is not sufficiently compressed to have any effect upon the system.

The above described operation of driving the charge of oil through the pipe line system is with reference to the filling of the trap basin unit for the first time. The succeeding operations are not materially different in function from the initial operation. Upon driving a subsequent charge of lubricant through the system to perform a lubricant distributing operation, the bodies of oil trapped in the lower parts of the pipe line system are merely driven ahead of the main charge, the air between such columns or bodies of oil as remain in the pipe line system being expelled either through the bearings or through the remainder of the pipe line system into the crank case or oil reservoir 1.

*Progressive distribution and progressive lubrication*

Figures 15, 16, 17, 18, 19, 20, 21, 22, 23, 24, 25 and 26 are laid out particularly to clearly illustrate the progressive filling of the lubricant measuring chambers of the metering units and the progressive lubrication of the bearings from these chambers. Figures 15, 16, 17, 18, 19 and 20 show the consecutive or progressive filling of the trap basin measuring chambers of the metering units and the consecutive or progressive lubrication of the bearings during the priming operation, which means the first lubricating operation as, for example, on a new automobile. Figures 21, 22, 23, 24, 25 and 26 show schematically the same operation as stated above after the pipe line system is once primed with lubricant.

*Explanation of figures 15 to 20, inclusive*

There are three bearings shown with oil entering from the right and leaving the bearings at the left. The pipe line 150, shown at the bottom and which extends to the right and then upwards, is the return pipe. There are six positions shown. The bearings which are designated at 151, 152, and 153 are all dry in Figures 15 and 16, because no lubricant has ever been supplied thereto. The metering units are indicated at 155, 156 and 157, and the lower level pipe line portions ahead of the metering unit for the first bearing and between the metering units for the first and second and second and third bearings are indicated at 158, 159, and 160, respectively. Now lubricant is pressed in from the oil measuring and air supply chamber.

Figure 15 shows that the lubricant has not yet reached the metering unit for the first bearing.

Figure 16 shows that the lubricant covers the metering unit for the first bearing and completely fills the trap basin chamber of this metering unit, but has not reached the second metering unit. This figure, therefore, shows metering unit 155 filled with oil, but bearing 151 is still dry because the oil which is under pressure has not had time to penetrate the felt resistance plug 162 of the first metering unit. Metering unit 156 and bearing 152 are dry and metering unit 157 and bearing 153 are also dry.

Figure 17 shows that the oil column 170 has completely passed the first metering unit 155. Oil is now in the trap basin of the first metering unit 155 and the oil column 170 has moved to the second metering unit 156. Approximately during the time that the oil column 170 travels from the first metering unit 155 to the second metering unit 156, or from the second metering unit to the third metering unit, from the third metering unit to the fourth metering unit or to its succeeding metering unit or even after the moving oil 170 has passed the last metering unit, and depending upon the air pressure exerted upon the moving column of oil and the viscosity of the oil used, the oil may have penetrated the resistance plug 162 of the first metering units of the series or there may be no appreciable passage of oil from any of the metering units until completion of the pressure operation. The oil will have sufficient time during the relatively long lubrication period which follows the pressure period to run through the felt plugs by gravity and thereafter lubricate the bearings.

For the sake of an easy understanding of this phase of the present invention, assume that a very thin oil is used, which will penetrate the first dense felt plug 162, during the time that the oil moves under air pressure from the first metering unit 155 to the second metering unit 156. Figure 17 shows that the first metering unit 155 has been filled with the metered quantity of oil and the bearing 151 lubricated therefrom, as indicated by the heavier line around this bearing. The second metering unit 156 is also filled with oil, but no oil has yet reached the bearing 152 and the third metering unit is dry and so is the third bearing 153. While it is an object of this invention to lubricate the bearings by gravity with a high viscosity oil after the pressure period has ceased, the bearings can, in addition, also be lubricated during the pressure period particularly when an oil of low viscosity is used. The distribution of oil to the metering units and the lubrication of the bearings from the metering unit is, in either case, progressive or consecutive.

Figure 18 shows the oil column 170 above the metering unit 157 for the third bearing, which means that the first metering unit has been filled with oil, the first bearing 151 lubricated, the second metering unit 156 has been filled with oil, the second bearing 152 lubricated and the third metering unit is filled with oil, but the third bearing 153 is dry, for the reason explained above.

Figure 19 shows all three bearings wet with oil, which means that all three metering units have been filled with the metered oil, these units being each substantially full of oil, as shown, as are the metering units 155 and 156 of Figure 18 and the metering unit 155 of Figure 17.

The oil column 170, composed of excess oil is now seen at the bottom run of the pipe line system, returning to the oil reservoir or crank case from where it came. The thick lines on the pipe line indicate oil sticking to the walls of the pipe line, due to the surface tension or the adhesive action of the oil on the inside surface of the pipe line. The relative quantity of the oil which sticks to the pipe line depends upon the viscosity of the oil used and the inside diameter of the pipe line.

Figure 19 shows the trap basins or the measuring chambers of all three metering units empty and all three bearings wet with fresh oil derived from the last lubricating operation. The oil sticking to the inside surface of the pipe line has now been permitted to drain to the lower level portions of the pipe line and the greater quantity of air which has been blown into the pipe line system has, due to the venting of the system through the return end of the pipe line, now been reduced to atmospheric pressure and will rise to points above the metering units in the trap chambers. Depending upon the inside diameter of the pipe line and the viscosity of the oil used, more or less broken up air bubbles of various sizes will stay in the oil column settled at the bottom portion of the pipe line and in the lower level portions of the pipe line below the metering units, as indicated at 175, in Figure 20. The combination of broken up oil columns and air columns in the pipe line system makes the pipe line contents very resilient, and it is this resiliency of the pipe line contents which makes the distribution and lubrication of the bearings consecutive or progressive.

*Explanation of Figures 21 to 26, inclusive*

While the oil and the air entrapped in the oil move now in a slightly different manner than that explained in connection with the priming operation of Figures 15 to 20, inclusive, I will now show that the filling of the trap basin or measuring chambers of the metering units and the lubrication of the bearings is here again—after the pipe line system is once primed with lubricant—done in exactly the same consecutive or progressive manner, as during the priming operation, shown in Figures 15 to 20.

For the sake of a better understanding, I am now showing four bearings, instead of three bearings. The additional bearing may be designated 180 and the additional metering unit, therefore, may be designated 182 for facility of understanding.

Figure 21 shows the oil situated in the pipe line system exactly the same as in Figure 20, the only difference between these figures being that the bearings which have been wet in Figure 20 are now dry in Figure 21.

Figure 22 shows a new incoming oil charge or column pressed into the pipe line system for the oil measuring and air supply chamber. Since the oil of the felt resistance plug of the first metering unit 155, shown at the right, has, since the previous lubrication, run into the bearing by gravity and has substantially left the bearing, both the metering unit, with its felt resistance plug, and the bearing supplied by this metering unit are now substantially dry.

The incoming oil column, before it reaches the trap basin of the first metering unit, will expel about one half of the air situated above and in the trap basin of the first metering unit through the substantially dry felt resistance plug 162 and the dry first bearing 151, until the air outlet through the first bearing connected with the first metering unit is closed by the incoming oil column. Up until that moment, the remaining one-half or other portion of the small air column 190 (Figure 22) situated over the first metering unit has not been substantially compressed and the oil column situated at the bottom of the bent pipe line between the first and second metering units, as indicated at 196, has remained unchanged. The moving oil column, after completely filling the trap basin of the first metering unit, during relatively short periods of time and during a small first part of its movement is still not disturbing the level position of the oil column, which has settled at the lower level pipe line portion between metering units 1 and 2 because the surface tension or the adhesive qualities of this oil column are considerably greater than the small pressure of the first half or first part of the entrapped air column, which first half or first part is escaping through the first dry felt plug resistance member 162 of the first metering unit and through the first dry bearing 151. As soon as the first half or first part of this first air column has escaped through the first bearing and the first metering unit has been sealed with oil, as shown in Figure 22, the remaining portion of this first air column will be compressed and will overcome the resistance created through the adhesion or surface tension of this resting oil column between the first and second metering units and this column will start to move forward.

For the sake of easy understanding, I will refer to the four air columns originally situated over the four metering units as 192, 193, 194 and 195, while the oil column situated between the first and second bearing is designated at 196, the oil column between the second and third bearing 197 and the oil column between the third and fourth bearing 198 and between the fourth bearing and the outlet 199.

The horizontal oil column between the incoming pipe and the first bearing I have given no designation because it will combine itself with the incoming oil column. All four bearings are still dry.

Figure 23 shows the first trap basin completely filled with oil and the first bearing lubricated. In order to avoid any misunderstanding, I want to repeat that the first bearing would, in the above case, only be lubricated under pressure, if a very thin oil is used. Due to the fact that medium or heavy viscosity oil is preferably used with my system, the first bearing will be lubricated after all trap basins have been completely filled with heavy oil. As stated before, the time interval between the filling of a trap basin of a metering unit and the lubricating of the bearing connected with this metering unit is regulated by the viscosity of the lubricant used, but this time interval does not change, in any manner whatsoever, the progressive or consecutive manner of lubricating the bearings, as shown in Figures 21 to 26, inclusive.

The air column is now compressed enough to overcome the surface tension or adhesion of the oil column 196, which is now moved over the second bearing and has completely filled the trap basin for the second bearing. If the second bearing is dry, one-half or a portion of the air column 193 has escaped through the dry second bearing. In case, however, that this second bearing would, for instance not be dry, but still wet from the previous lubrication, this would not change the progressive or consecutive manner of filling the trap basin or measuring chambers, nor the progressive or consecutive manner of lubricating the bearings one after the other, because the entire lubricate this bearing. It shows that air columns 192, 193 and 194 have moved forward and a part of the air column 195 has escaped through the dry fourth bearing. It also shows that oil columns 196, 197 and 198 have moved while oil column 199 remains at its former position.

Figure 26 shows the incoming air column which follows the incoming oil column is now situated over the metering units for the first two bearings. It shows that the fourth bearing has been lubricated after the third, second, and first bearings were consecutively or progressively lubricated before it. It shows that air columns 192, 193, 194, and 195; and oil columns 196, 197, 198, and 199, have moved forward.

The lubricating operations, as shown in Figures 21 to 26, inclusive, have shown that all lubricating operations following the priming or first lubricating operation always fill the measuring chambers of the metering units and afterwards lubricate the bearings consecutively, that is, progressively, that is, one after another, and therefore, always in the same rotation and never simultaneously.

I do not intend to be limited to the details shown or described, as I consider a large part of the features and combinations herein disclosed to be broadly new and I intend that the claims herein be construed as broadly as is permitted by the prior art.

I claim:

1. In a lubricating system, a plurality of bearings, a conduit having spaced openings communicating with said bearings, a restriction in said conduit beyond the communication with the last bearing, means for measuring a body of oil and compressing a charge of air and means for opening the inlet to said conduit to said body of oil and charge of air whereby said oil is driven communicating with said openings and members projecting through said openings and into the trap basins for insuring the delivery of lubricant into the trap basins.

7. In a lubricating system a continuous conduit having a plurality of lateral openings, trap basins communicating with said openings and means to drive a detached body of lubricant throughout said conduit from one end to the other.

8. In a lubricating system, a continuous conduit having a plurality of lateral openings, trap basins communicating with said openings and means for driving a body of air through said conduit to drive a detached body of lubricant throughout said conduit from one end to the other.

9. In a lubricating system a continuous conduit having a plurality of lateral openings, trap basins communicating with said openings, an oil supply chamber communicating with one end of the conduit and an oil receiving chamber at the other end of the conduit.

10. In a lubricating system a continuous conduit having a plurality of lateral openings, trap basins communicating with said openings, and means for automatically propelling a charge of lubricant throughout said conduit periodically.

11. In a lubricating system a continuous conduit having an open discharge end, a plurality of lateral openings, trap basins communicating with said openings, and a pneumatic displacement chamber communicating with one end of the conduit.

12. In a lubricating system a continuous conduit open at both ends, said conduit having intermediate its ends a plurality of lateral openings, trap basins communicating with said openings, a pneumatic displacement chamber communicating with the adjacent end of the conduit, an oil reservoir communicating with the remote end of the conduit, and a valved communication between the oil reservoir and the pneumatic displacement chamber.

13. In combination with a machine having bearings to be lubricated, said machine having a moving member of lubricant supply means comprising a measuring chamber and a lubricant pump delivering to said chamber and building up a charge of compressed air therein, said system including a continuous conduit having a plurality of lateral openings, and trap basins communicating with said openings and adapted to convey lubricant to the bearings.

14. In a lubricating system a plurality of bearings, a trap basin for each bearing, a continuous conduit extending seriatim over said trap basins and having openings communicating with the tops of the trap basins, the conduit on each side of the trap basins being depressed to drain and pocket lubricant adhering to the walls of the conduit.

15. In a lubricating system a bearing, a trap basin having an outlet leading to the bearing, a conduit extending past said trap basin on each side and having an opening laterally to the top of the trap basin, the conduit on each side of the trap being graded down to drain and pocket lubricant adhering to the walls of the conduit, and means restricting the outlet from said trap basin.

16. In combination, a bearing having an oil supply passage, a trap basin unit disposed above the bearing and having an outlet connected to said bearing, an inlet pipe portion leading into the unit, a discharge pipe portion leading away from the unit, said pipe being bent down from the unit to retain oil away from the unit and to retain air in the top of the unit and at the upper part of said pipe.

17. A lubricating system for the chassis bearings of a motor vehicle, comprising a main conduit, a plurality of measuring chambers, each located adjacent a bearing and being proportioned to contain a quantity of oil corresponding to the needs of the bearing and adapted to receive oil from the main conduit, means for forcing a greater quantity of the oil through the main conduit than is necessary to fill all of the said measuring chambers and means for forcing a quantity of air through the main conduit to remove the surplus oil, said main conduit being bent downwardly at each side of said measuring chambers, whereby any oil clinging to the walls of the conduit after the passage of the air will drain into the downwardly bent portion instead of into the measuring chamber.

18. In a lubricating system for supplying the fluid lubricant to the chassis bearings of a motor vehicle, a branched conduit leading to the bearings and having an inlet, flow resisting means at the bearings, means for intermittently introducing quantities of lubricant to the inlet, means for distributing lubricant to each of the branches, the outlets of some of said branches being at a lower level than the outlets of others, and means to break up siphons between outlets at different levels.

19. In a system for the lubrication of a plurality of bearings, the combination of devices adjacent each of the bearings to be lubricated for retaining a limited quantity of lubricant thereat, a source of supply, means for segregating a charge of lubricant from said source for supply to said devices, conduit means for progressively conveying the segregated charge of lubricant to said lubricant retaining devices, means for slowly conducting the lubricant from said retaining devices to the bearings, and means for conveying the surplus lubricant of said measured charge to said source of lubricant.

20. In a centralized system for the lubrication of a plurality of bearings, the combination of a conduit, means for retaining lubricant under air pressure, means for connecting said retaining means with said conduit, said means being arranged to permit flow of lubricant and air from said retaining means to said conduit, and trap basins supplied with lubricant from said conduit, said trap basins having means for separating the lubricant from the air and conducting the separated lubricant to the bearing to be lubricated.

21. In a centralized lubricating system for a machine having a moving part and a plurality of bearings to be lubricated, the combination of means for measuring a charge of lubricant sufficient to lubricate a plurality of the bearings of said machine for a given time, means deriving its power from said moving part for compressing a quantity of air above said charge of lubricant, a conduit for receiving lubricant and air from said measuring means, a plurality of lubricant collecting devices connected to said conduit for separating lubricant from air passing through said conduit and conducting the lubricant to the bearings to be lubricated, and automatically operable means for opening a passageway from said measuring means to said conduit.

22. In a centralized lubricating system for a machine having a moving part and a plurality of bearings to be lubricated, the combination of a lubricant receiver normally containing air, means actuated by said moving part of the machine for supplying lubricant to said measuring means thereby to compress the air contained therein, conduit means for conducting lubricant and air from said measuring means to the bearings requiring lubrication, means for connecting said measuring means to said conduit to permit flow of lubricant from the former to the latter to the bearings to be lubricated, and trap basins connected to said conduit and to said bearings, respectively, to separate a predetermined quantity of lubricant from the lubricant supply to said conduit and slowly to feed said predetermined quantity of lubricant to its associated bearing.

23. A lubricating system for the chassis bearings of a motor vehicle, comprising a reservoir, means for removing a predetermined quantity of oil from said reservoir and supplying it and air under pressure to the chassis bearings, means at each bearing for intercepting and measuring out a quantity of the oil proportioned to the needs of the bearing and means for returning at least a portion of the unused oil and a major portion of the air to the reservoir.

24. A lubricating system for the chassis bearings of a motor vehicle, comprising a main conduit, a plurality of measuring chambers, each located adjacent a bearing and being proportioned to contain a quantity of oil corresponding to the needs of the bearing and adapted to receive oil from the main conduit, means for forcing a greater quantity of the oil through the main conduit than is necessary to fill all of the said measuring chambers and means for forcing a quantity of air through the main conduit to remove the surplus oil, said main conduit being bent downwardly at each side of said measuring chambers, driven pump having an outlet connected to the chamber for the purpose of creating a pressure therein, separate valve means controlling the inlet and the outlet of said chamber, means to alternately open said valves, and means to proportion the amount of oil delivered to the respective outlets.

28. In a chassis lubricating system for automobiles of the type having a pressure lubricating system for the engine bearings, a branched conduit leading to the chassis bearings and having an inlet, a supply chamber adapted to supply oil to said inlet, means for connecting said supply chamber to the pressure system, a flow regulating means in said connecting means and inertia operated means for removing any obstructions from said regulating means.

29. In a chassis lubricating system for automobiles of the type having a pressure lubricating system for the engine bearings, a branched conduit leading to the chassis bearings and having an inlet, a supply chamber adapted to supply oil to said inlet, means for connecting said supply chamber to the pressure system, a highly restrictive flow regulating means operable to permit flow therethrough upon a predetermined pressure differential upon the opposite sides thereof in said connecting means, and means for normally preventing any solid matter carried by the oil in said pressure system from reaching said regulating device.

30. An oil cup comprising a chamber, having means at one end thereof for connecting to an oil receiving member, and an open top having a substantially semi-cylindrical concave conformation adapted to receive the side of an oil conduit.

31. An oil cup comprising a chamber, having means at one end thereof for connecting to an oil receiving member, and an open top having a 36. In a chassis lubricating system for automobiles having an engine lubricating system for the engine bearings, and a plurality of bearings extraneous thereto requiring lubrication, conduit means for supplying oil to the extraneous bearings, entirely automatic means operated by the power which moves the car to supply oil to said conduits, means for measuring out a predetermined quantity of said oil at each bearing, means for removing at least a portion of the remainder of said oil from said conduits by forcing air therethrough, and entirely automatic means operated by the power which moves the car for supplying predetermined quantities of oil to the bearings at periodic intervals.

37. In a chassis lubricating system, a plurality of bearings at different levels to be lubricated, a flow controlling device at each bearing presenting a constantly open but restricted outlet, a single conduit successively connected to a plurality of said measuring devices, means for periodically supplying lubricant to said conduit, and means to prevent siphoning of lubricant out of the lower bearings between the periods at which the lubricant is supplied.

38. In a chassis lubricating system for vehicles having a power plant and a lubricating system therefor, a chamber adapted to receive lubricant from said system, a branched conduit adapted to convey lubricant from said chamber to bearings of said vehicle extraneous to said engine, normally closed means controlling communication between the said chamber and said conduit, and means for opening said communication when the oil level in said chamber rises to a predetermined level.

39. In a chassis lubricating system for vehicles having a power plant and a lubricating system therefor, a chamber adapted to receive lubricant from said system, a branched conduit adapted to convey lubricant from said chamber to bearings of said vehicle extraneous to said engine, normally closed means controlling communication between the said chamber and said conduit, means for opening said communication when the oil level in said chamber rises to a predetermined level, and means for holding said communication open until a predetermined quantity of lubricant is discharged from said chamber.

40. In a chassis lubricating system for vehicles having a power plant and a lubricating system therefor, a chamber adapted to receive lubricant from said system, a branched conduit adapted to convey lubricant from said chamber to bearings of said vehicle extraneous to said engine, a float operated valve in said chamber for controlling communication between the said system and the chamber, said valve being arranged to close while lubricant is being supplied to the bearings from said chamber, and a self-closing valve arranged to be opened by said float after a predetermined quantity of lubricant has been supplied thereto.

41. A chamber for measuring fluids comprising an air tight receptacle, an inlet in said receptacle, a port at a low level and an outlet at a higher level, normally closed valves for said outlet and for said port, a normally open valve for said inlet, said inlet being connected to a source of fluid under pressure, means for simultaneously closing the inlet and opening the outlet when the liquid in the chamber reaches a predetermined level, whereby a portion of said liquid may be discharged through the outlet, and means for opening said port when the liquid in said chamber has fallen to a predetermined level.

42. In a device of the class described, a plurality of bearings requiring lubrication, a device at each bearing comprising a body member having a measuring chamber therein, and a pair of oppositely disposed conduit receiving portions integral with said body member and extending therefrom, said measuring chamber having an outlet, and having communication with the conduit, but being otherwise sealed, means at the outlet of the measuring chamber restricting flow of lubricant therefrom, said measuring chamber being constructed and arranged to receive predetermined quantities of lubricant upon alternate passage of lubricant and air through said device, conduit means connecting said devices in series, and intermittently operated means for successively passing lubricant and air through said conduit means and through said devices whereby said measuring chambers may be charged.

43. In a device of the class described, a plurality of bearings requiring lubrication, a device at each bearing comprising a body member threaded to said bearing at one end and having a measuring chamber therein, adjacent the said end, and a pair of oppositely disposed conduit receiving portions integral with said body member and extending therefrom, said measuring chamber having an outlet, and having communication with the conduit, but being otherwise sealed, means at the outlet of the measuring chamber restricting flow of lubricant therefrom, said measuring chamber being constructed and arranged to receive predetermined quantities of lubricant upon passage of lubricant through said device, conduit means connecting said devices in series, and intermittently operated means for successively passing lubricant and air through said conduit means and through said devices whereby said measuring chambers may be charged.

44. In a device of the class described, a plurality of bearings requiring lubrication, a measuring device at each bearing, means connecting said devices in series, the whole flow to each device passing through the preceding one, a source of supply, intermittently operated means for successively forcing lubricant and air from said source through the connecting means, said devices being constructed and arranged to measure out and segregate a predetermined quantity of lubricant at each intermittent operation, said measuring chambers each having an outlet to the adjacent bearing and with the series connections, but being otherwise sealed.

45. A lubricating system for a plurality of bearings comprising an oil sump, a pump for removing oil from said sump and having an outlet, an elevated reservoir, a plurality of catch pockets for oil in series, means for conveying oil from each of said catch pockets to a bearing, means to convey a stream of oil and thereafter a stream of air from the reservoir to the catch pockets in series so that each will be filled to the top, means connected to the last catch pocket of the series to convey the surplus oil from the catch pockets to the oil sump, conduit means to convey oil from the outlet of the pump to the reservoir, a passageway in said conduit means of larger size than necessary to pass the required amount of oil to the reservoir, a rotatable member of slightly smaller size than said passageway and located therein, and means to rotate said member.

46. In a motor vehicle of the type having a pressure feed lubricating system for certain of the bearings thereof, a lubricating device for other bearings of the vehicle, comprising a conduit leading from the pressure system to a valve chamber comprising means for alternately discharging oil and air, conduit means leading from the valve chamber through points near the said other bearings, back to the sump, catch pockets in series in the said conduit means adjacent the said other bearings and adapted to intercept oil flowing from the reservoir to the sump, and means to convey oil from the said pocket means to the said bearings.

47. In a motor vehicle, an internal combustion engine having an oil sump in the lower part thereof, means defining an upper chamber above the oil sump for containing oil and air during operation, a plurality of bearing parts requiring lubrication, a pump in the oil sump driven by the engine to withdraw oil from the sump, means defining a pressure conduit leading from the outlet of the pump to some of said bearing surfaces, means affording communication from the pressure conduit to the upper chamber, a relief valve controlling said last named means and opening toward the chamber under pressure from the pump, a lubricant outlet leading from the chamber at a level considerably above the bottom thereof, other parts requiring lubrication, conduit means leading from said outlet to said last named parts, means for conveying unused lubricant from said parts back to the reservoir, and means for draining lubricant from a point in said chamber below the first named outlet thereof.

48. In a lubricating system for motor vehicles, an engine housing, an oil sump below said housing and arranged to receive drainage therefrom, an oil pump mounted in the lower part of said sump for operation by the engine, bearing surfaces in said sump forming parts of the engine, bearing surfaces in said housing above the surface of the oil therein, means for conveying lubricant from the pump to the said bearing surfaces, means dethe reservoir back to said sump, a plurality of catch pockets in series interposed in said draining means, each of said catch pockets being adjacent a bearing of a second group, means for conveying oil from each catch pocket to the corresponding bearing, said draining means being constructed and arranged to flow the oil over the catch pockets in series and fill them and to return the surplus oil back to the sump, said second outlet being constructed and arranged to drain oil from the reservoir to said housing only as the oil level falls below the level of the first named outlet.

51. In a motor vehicle, an engine having a crank case and an oil sump arranged to receive oil drained from said crank case, an engine operated pump in the lower part of the oil sump and adapted to deliver oil therefrom, conduit means connected to said pump and arranged to maintain a stream of oil delivered from the pump in contact with a plurality of the bearing surfaces of said engine, a reservoir above said sump, an oil passageway leading from said conduit to said reservoir and adapted to convey oil thereto, a group of bearings requiring lubrication, a plurality of catch pockets one located adjacent each of the bearings of said group, and means for intermittently flowing oil and air successively from said reservoir over said catch pockets in series.

52. In a lubricating system, a plurality of measuring devices for intermittently discharging predetermined quantities of lubricant, conduit means connected to said devices in series for supplying lubricant thereto, an accumulator connected to said conduit, means for introducing lubricant into said accumulator under pressure, said accumulator being constructed and arranged to intermittently discharge a predetermined portion of the lubricant contained therein into said conduit in quantities sufficient to supply all of receive and retain a predetermined quantity of lubricant from said pump, means for discharging the lubricant from the accumulator when a predetermined quantity is stored in the accumulator, and control devices for supplying lubricant to individual bearings and adapted to intermittently receive lubricant from the accumulator device.

57. In a central lubricating system, a receiving chamber having an inlet and an outlet, valve means controlling said outlet and having two operating positions, in one of which the valve is closed, and in the other of which the valve is open, mechanically operated pump means for delivering lubricant under pressure to said inlet, conduit means leading from said outlet to deliver lubricant to points requiring lubrication, means for shifting said valve mechanism to said first named position, and automatic means operative upon the introduction of a predetermined quantity of lubricant into said chamber to shift the valve mechanism to the said second position.

58. In a lubricating device for bearings, a plurality of outlet devices, discharge control means in each device, a conduit connecting said devices, a measuring chamber having an outlet connected to said conduit and an inlet, means for forcing lubricant into said inlet under pressure, a valve controlling said outlet, and means for operating said valve when a predetermined quantity of lubricant has been forced into said chamber.

59. In a chassis lubricating system, a lubricant reservoir, means to receive lubricant from said reservoir and deliver it under pressure, a valve chamber having an outlet and an inlet constructed and arranged to receive lubricant from said pressure means, valve means having a movable part in said chamber controlling communication between said inlet and said outlet, a weight attached to said movable part to cause movement thereof upon vibration of the chassis, spring means normally holding said valve in closed position, a port in said chamber of sufficient size to permit the insertion of said weight and movable part, and a screw threaded closure for said port, said closure being arranged to support one end of the said spring.

60. In a chassis lubricating system, a supply reservoir, a plurality of bearings to be lubricated, conduit means having a plurality of outlets to supply the oil to the said bearings, means in each outlet to govern the discharge of lubricant to the corresponding bearing, means to deliver lubricant from said reservoir slowly under pressure to said conduit means, a check valve cooperating with a valve seat and arranged to permit flow toward said conduit means from said delivery means, and a weight supported by said valve and arranged to be vibrated by the motion of the vehicle to cause movement of the valve upon its seat.

61. In a chassis lubricating system, a lubricant reservoir, a distributing conduit system arranged to receive lubricant from said reservoir and having an outlet, valve mechanism controlling communication between said reservoir and said system, a float connected to said valve mechanism to yieldably hold the valve in closed position, and means for forcing lubricant through said outlet when said valve is closed.

62. In a chassis lubricating system for automobiles of the type having a pressure lubricating system for the engine bearings, a supply chamber for the chassis system, means connecting the inlet of said chamber to the pressure system of the engine for receiving lubricant therefrom, a restricted passageway in said connecting means for causing slow substantially continuous filling of said chamber, and means to remove impurities from the oil, said last named means being located between the engine and the restricted passageway.

63. In a lubricating system, a plurality of bearings to be lubricated, a source of lubricant under pressure, a flow restricting device including a passageway between said source and said bearings, a member partially obstructing flow through said passageway, and means for causing movement of said member without appreciably altering its flow obstructing effect for the purpose of displacing any particles of solid matter which may become lodged in said passageway.

64. In a lubricating system, a measuring chamber for lubricant comprising a hollow body member of calibrated capacity, an inlet and an outlet at one end of said body member and a second outlet at the other end, means for alternately forcing oil and air past said hollow body through said inlet and first named outlet, and a resistance member at said second outlet to prevent passage therefrom of more than a negligible quantity of lubricant while the chamber is being filled.

65. A device as described in claim 64 and having means at the inlet to resist the formation of any air lock which would prevent the filling of the body with lubricant.

66. A device as claimed in claim 64 and in which said flow resistance comprises a body of porous material.

PETER WILLIAMSON, Jr.